United States Patent
Chae et al.

(10) Patent No.: US 11,107,456 B2
(45) Date of Patent: *Aug. 31, 2021

(54) ARTIFICIAL INTELLIGENCE (AI)-BASED VOICE SAMPLING APPARATUS AND METHOD FOR PROVIDING SPEECH STYLE

(71) Applicant: LG ELECTRONICS INC., Seoul (KR)

(72) Inventors: Jonghoon Chae, Seoul (KR); Minook Kim, Seoul (KR); Sangki Kim, Seoul (KR); Yongchul Park, Seoul (KR); Siyoung Yang, Seoul (KR); Juyeong Jang, Seoul (KR); Sungmin Han, Seoul (KR)

(73) Assignee: LG ELECTRONICS INC., Seoul (KR)

(*) Notice: Subject to any disclaimer, the term of this patent is extended or adjusted under 35 U.S.C. 154(b) by 88 days.

This patent is subject to a terminal disclaimer.

(21) Appl. No.: 16/561,410

(22) Filed: Sep. 5, 2019

(65) Prior Publication Data

US 2020/0005763 A1    Jan. 2, 2020

(30) Foreign Application Priority Data

Jul. 25, 2019   (KR) .................. 10-2019-0090462

(51) Int. Cl.
  *G10L 15/02*   (2006.01)
  *G10L 13/08*   (2013.01)
  (Continued)

(52) U.S. Cl.
  CPC .......... *G10L 13/08* (2013.01); *G10L 13/0335* (2013.01); *G10L 13/047* (2013.01); *G10L 15/02* (2013.01)

(58) Field of Classification Search
  CPC ....... G10L 13/08; G10L 13/10; G10L 13/033; G10L 13/0335; G10L 13/04; G10L 13/047; G10L 13/06; G10L 13/07; G10L 15/02
  (Continued)

(56) References Cited

U.S. PATENT DOCUMENTS 10,741,169 B1 *   8/2020   Trueba .................... G10L 13/10
10,796,686 B2 *   10/2020  Arik ....................... G10L 13/027
  (Continued)

FOREIGN PATENT DOCUMENTS

KR   10-2019-0085882 A   7/2019
KR   10-2019-0087351 A   7/2019

OTHER PUBLICATIONS

Wang et al. (2018). Style Tokens: Unsupervised Style Modeling, Control, and Transfer in End-to-End Speech Synthesis. arXiv preprint arXiv:1803.0917.. (Year: 2018).*

*Primary Examiner* — Susan I McFadden
(74) *Attorney, Agent, or Firm* — Birch, Stewart, Kolasch & Birch, LLP

(57) ABSTRACT

Discussed is an artificial intelligence (AI)-based voice sampling apparatus for providing a speech style, including a rhyme encoder configured to receive a user's voice, extract a voice sample, and analyze a vocal feature included in the voice sample, a text encoder configured to receive text for reflecting the vocal feature, a processor configured to classify the vocal feature of the voice sample input to the rhyme encoder according to a label, extract an embedding vector representing the vocal feature from the label, and generate a speech style from the embedding vector and apply the generated speech style to the text, and a rhyme decoder configured to output synthesized voice data in which the speech style is applied to the text by the processor.

15 Claims, 5 Drawing Sheets

(51) Int. Cl.
 *G10L 13/033* (2013.01)
 *G10L 13/047* (2013.01)

(58) Field of Classification Search
 USPC .......................................................... 704/232
 See application file for complete search history.

(56) References Cited

U.S. PATENT DOCUMENTS

2020/0005764 A1* 1/2020 Chae ........................ G10L 13/10
2020/0019842 A1   1/2020 Kim
2020/0082807 A1   3/2020 Kim et al.

* cited by examiner

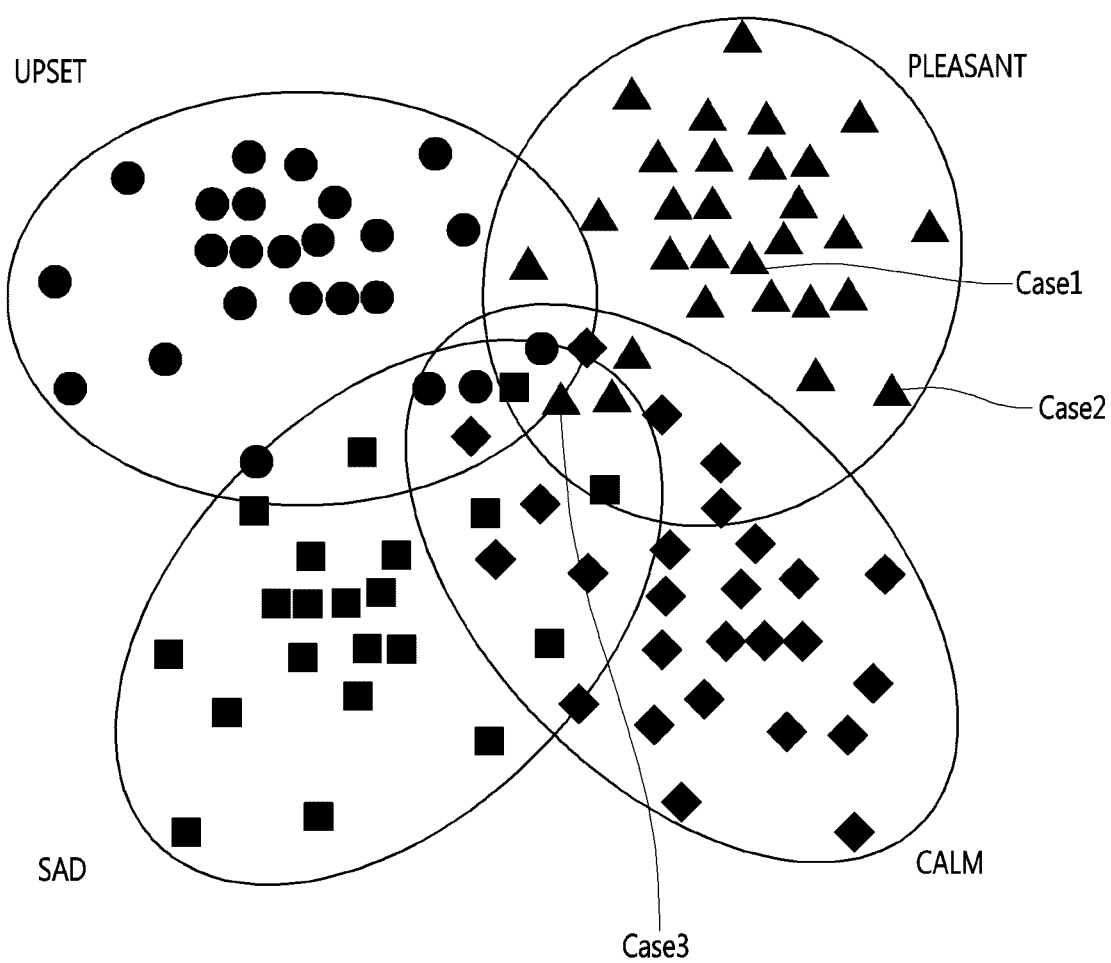

ARTIFICIAL INTELLIGENCE (AI)-BASED VOICE SAMPLING APPARATUS AND METHOD FOR PROVIDING SPEECH STYLE

CROSS-REFERENCE TO RELATED APPLICATIONS

This application claims priority to Korean Patent Application No. 10-2019-0090462 filed on Jul. 25, 2019 in Korea, the entire contents of which is hereby incorporated by reference in its entirety.

BACKGROUND

The present invention relates to an artificial intelligence (AI)-based voice sampling apparatus and method for providing a speech style, and more particularly, to a voice sampling apparatus and method for selecting a representative sample for providing a speech style in a deep learning-based speech synthesis system.

Artificial intelligence, which is a field of computer engineering and information technology to study how to enable a computer to think, learn, make self-development, etc. Which may be done with human intelligence, refers to allowing a computer to imitate intelligent behaviors of human beings.

In addition, artificial intelligence does not exist per se but is directly or indirectly related to other fields of computer science. Particularly in modern times, attempts are being actively made to introduce artificial intelligence elements in various fields of information technology and use them to solve problems in those fields.

In particular, speech recognition technology employing artificial intelligence is also developing and voice-based communication, one of the tools for basic, effective communication of human beings, provides intuitive, convenient services to users and some devices use a voice user interface that enables interaction using voice. A simple way to implement a voice response in a voice user interface of a related art is audio recording but has a limitation that only a recorded voice can be used. Such a device cannot provide a response service for an unrecorded voice and thus is inflexible in its use. In this environment, many researchers are trying to create natural, fast speech synthesis models. In addition, text-to-speech synthesis, also called text-to-speech (TTS), capable of generating speech from text, has been widely studied.

In this regard, the related art Korean Patent Laid-Open No. 2019-0026518 (Operation method of artificial intelligence voice recognition device), which includes receiving a voice input signal of a user through a microphone, transmitting voice data corresponding to the voice input signal to a voice recognition server system, identifying a user on the basis of a frequency and strength of the voice input signal, receiving a response signal on the basis of the voice input signal from the voice recognition server system, and outputting a voice guidance message corresponding to the received response signal, wherein the outputting of the voice guidance message includes outputting a voice guidance message by voice based on tone data stored in a database corresponding to the identified user to thereby provide user-customized voice guidance.

However, since the related art provides the function of identifying a user and generates only a response signal thereto and does not analyze a rhyme for user's speech or analyze a speech style, a text-type voice is output, having a limitation in providing a natural interactive service, and a user-friendly, natural dialogue cannot be generated.

SUMMARY

An aspect of the present invention is directed to providing an artificial intelligence (AI)-based voice sampling apparatus and method for applying a speech style reflecting a user's voice in speech synthesis.

Another aspect of the present invention is directed to providing an AI-based voice sampling apparatus and method for providing synthesized voice data by applying an embedding technology to secure a voice sample for applying a speech style to a motion.

To achieve these and other advantages and in accordance with the purpose of the disclosure, as embodied and broadly described herein, there is provided an artificial intelligence (AI)-based voice sampling apparatus for providing a speech style, including: a rhyme encoder configured to receive a user's voice, extract a voice sample, and analyze a vocal feature included in the voice sample; a text encoder configured to receive text for reflecting the vocal feature; a processor configured to classify the vocal feature of the voice sample input to the rhyme encoder according to a label, extract an embedding vector representing the vocal feature from the label, and generate a speech style from the embedding vector and apply the generated speech style to the text; and a rhyme decoder configured to output synthesized voice data in which the speech style is applied to the text by the processor.

According to an embodiment, the rhyme encoder may divide the voice sample by a predetermined label and extract an embedding vector for the label.

According to an embodiment, the rhyme encoder may extract the embedding vector through a vocal feature including at least one of a speech rate, a pronunciation intonation, a pause interval, a pitch, or an intonation of the user included in the voice sample.

According to an embodiment, the extracting of the embedding vector may include extracting through spectral information, sliding information, or a mean value.

According to an embodiment, the processor may select a voice sample closest to a mean value for each vector component of all voice samples in the label, from among a plurality of voice samples input from the user.

According to an embodiment, the processor may select a voice sample having the smallest sum of distances of the vector components to the each of voice samples among the plurality of voice samples input from the user.

According to an embodiment, the processor may select a voice sample having the smallest sum of the distances of the vector components to each of the voice samples in the label among the plurality of voice samples input from the user.

In another aspect, there is provided an artificial intelligence (AI)-based voice sampling method for providing a speech style, including: a first step of receiving a voice sample of a user through a rhyme encoder and analyzing a vocal feature included in the voice sample of the user; a second step of receiving a text for reflecting the vocal feature through a text encoder; a third step of extracting an embedding vector from the voice sample, generating a speech style by a processor, and applying the speech style to the text; and a fourth step of outputting synthesized voice data to which the speech style is applied, through a rhyme decoder.

According to an embodiment, the method may further include: generating an artificial neural network text-speech synthesis model by performing machine learning on the basis of a plurality of learning texts and voice data corresponding to the plurality of learning texts.

According to an embodiment, the second step may include: receiving a voice sample from the user; and dividing the voice sample into a preset label to extract an embedding vector for the label.

According to an embodiment, the embedding vector may be extracted through a vocal feature including at least one of a speech rate, a pronunciation intonation, a pause interval, a pitch, or an intonation of the user included in the voice sample.

According to an embodiment, the embedding vector may be extracted through spectral information, sliding information, or a mean value.

According to an embodiment, the processor may select a voice sample closest to a mean value for each vector component of all voice samples in the label, from among a plurality of voice samples input from the user.

According to an embodiment, the processor may select a voice sample having the smallest sum of distances of the vector components to the each of voice samples among the plurality of voice samples input from the user.

According to an embodiment, the processor may select a voice sample having the smallest sum of the distances of the vector components to each of the voice samples in the label among the plurality of voice samples input from the user.

According to an embodiment, the receiving of the voice sample may include receiving the voice sample from the user in real time from the user within a predetermined time interval.

According to the present invention having the configuration as described above, there is an advantage of extracting a voice sample closest to the user's speech style by providing a method of selecting a representative sample among voice samples.

Further, in the present invention, a feature vector may be easily extracted by providing spectral information-based acoustic feature information inference.

BRIEF DESCRIPTION OF THE DRAWINGS

The accompanying drawings, which are included to provide a further understanding of the disclosure and are incorporated in and constitute a portion of this application, illustrate embodiments of the disclosure and together with the description serve to explain the principle of the disclosure. In the drawings:

FIG. 7 illustrates a state in which a representative voice sample is selected according to an embodiment of the present invention.

DETAILED DESCRIPTION OF THE DISCLOSURE

Figure 1:
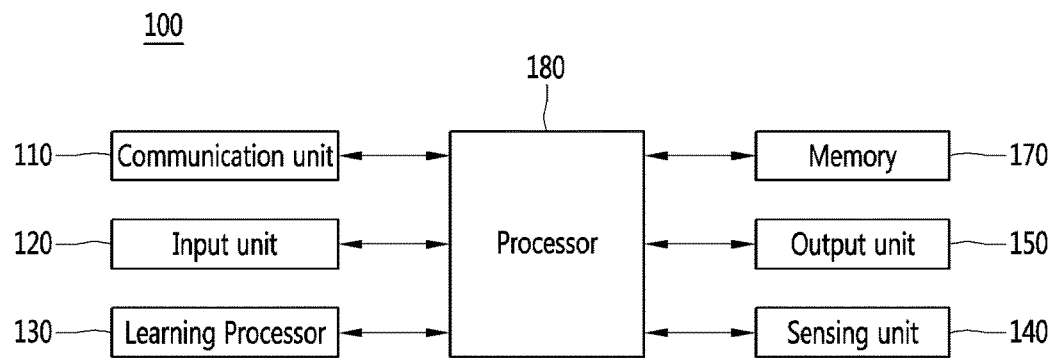
FIG. 1 illustrates an artificial intelligence (AI) device including a robot according to an embodiment of the present invention.

Hereinafter, the present invention will be described in detail with reference to the accompanying drawings. However, the present invention is not limited to or limited by the exemplary embodiments. Like reference numerals in the drawings denote members performing substantially the same function.

The objects and effects of the present invention may be understood or clarified naturally by the following description and the objects and effects of the present invention are not limited only by the following description. Also, in describing the present invention, if a detailed description of known functions or components associated with the present invention unnecessarily obscures the gist of the present invention, the detailed description will be omitted.

<Robot>

A robot may refer to a machine that automatically handles or operates a given task by its own ability. In particular, a robot that performs a function of recognizing an environment and performs an operation at its own discretion may be called an intelligent robot.

Robots may be classified as industrial, medical, household, military robots, and the like according to usage purposes or fields.

A robot may include a driving unit including an actuator or a motor to perform various physical operations such as moving a joint thereof. In addition, the moving robot may include a wheel, a brake, a propeller, and the like in the driving unit and travel on the ground or fly in the air through the driving unit.

<Artificial Intelligence (AI)>

Artificial intelligence (AI) refers to a field of studying artificial intelligence or a methodology capable of creating the same, and machine learning refers to a field of defining various problems handled in the field of AI and studying a methodology of solving the problems. Machine learning is defined as an algorithm that improves performance of a task through consistent experience over the task.

Artificial neural network (ANN), a model used in machine learning, may refer to a general model which includes artificial neurons (nodes) forming a network through a combination of synapses and has an ability to solve a problem. The ANN may be defined by a connection pattern between neurons of different layers, a learning process of updating a model parameter, and an activation function of generating an output value.

The ANN may include an input layer, an output layer, and one or more optional hidden layers. Each layer includes one or more neurons, and the ANN may include synapses that connect neurons. In the ANN, each neuron may output input signals input through the synapses, weights, function values of activation function for deflection.

The model parameter refers to a parameter determined through learning and includes a weight of synaptic connections and deflection of neurons. In addition, a hyperparameter refers to a parameter to be set before learning in a machine learning algorithm and includes a learning rate, the number of iterations, a mini-batch size, an initialization function, and the like.

The purpose of learning ANN may be considered as determining a model parameter that minimizes a loss function. The loss function may be used as an index for determining an optimal model parameter in the learning process of ANN.

Machine learning may be classified into supervised learning, unsupervised learning, and reinforcement learning according to a learning method.

Supervised learning refers to a method for training the ANN in a state where a label for learning data is given, and a label refers to a correct answer (or result value) that the ANN must deduce when the learning data is input to the ANN. Value). Unsupervised learning may refer to a method of training the ANN in a state where a label for learning data is not given. Reinforcement learning may refer to a learning method that trains an agent defined in a certain environment to select an action or sequence of actions that maximizes cumulative reward in each state.

Machine learning implemented by a deep neural network (DNN) including a plurality of hidden layers among ANNs is also referred to as deep learning, and deep learning is part of machine learning. Hereinafter, machine learning is used to include deep learning.

FIG. 1 illustrates an AI device 100 according to an embodiment of the present invention.

An AI device 100 may be implemented as a fixed device or a movable device such as a TV, a projector, a mobile phone, a smartphone, a desktop computer, a notebook computer, a digital broadcasting terminal, a personal digital assistant (PDA), a portable multimedia player (PMP), a navigation device, a tablet PC, a wearable device, a set-top box (STB), a DMB receiver, a radio set, a washing machine, a refrigerator, a digital signage, a robot, a vehicle, and the like.

Referring to FIG. 1, the terminal 100 includes a communication unit 110, an input unit 120, a learning processor 130, a sensing unit 140, an output unit 150, a memory 170, and a processor 180.

The communication unit 110 may transmit and receive data to and from external devices such as other AI devices 100a to 100e or an AI server 200 using wired or wireless communication technology. For example, the communication unit 110 may transmit and receive sensor information, a user input, a learning model, a control signal, and the like to and from external devices.

Here, the communication technology used by the communication unit 110 may include global system for mobile communication (GSM), code division multi access (CDMA), long term evolution (LTE), 5G, wireless LAN (WLAN), Wi-Fi (wireless-fidelity), Bluetooth™, radio frequency identification (RFID), infrared data association (IrDA), ZigBee, near field communication (NFC), and the like.

The input unit 120 may obtain various kinds of data.

In this case, the input unit 120 may include a camera for inputting an image signal, a microphone for receiving an audio signal, a user input unit for receiving information from a user, and the like. Here, the microphone may be considered as a sensor and the signal obtained from the camera or microphone may be referred to as sensing data or sensor information.

The input unit 120 may obtain input data to be used when obtaining an output using leaning data and a learning model for model learning. The input unit 120 may obtain raw input data, and in this case, the processor 180 or the learning processor 130 may extract input feature points as preprocessing on the input data.

The learning processor 130 may train a model configured as an ANN using the learning data. Here, the trained ANN may be referred to as a learning model. The learning model may be used to infer a result value for new input data other than the learning data, and the inferred value may be used as a basis for a determination to perform an operation.

In this case, the learning processor 130 may perform AI processing together with the learning processor 240 of the AI server 200.

In this case, the learning processor 130 may include a memory integrated or implemented in the AI device 100. Alternatively, the learning processor 130 may be implemented using a memory 170, an external memory directly coupled to the AI device 100, or a memory held in an external device.

The sensing unit 140 may obtain at least one of internal information of the AI device 100, surrounding environment information of the AI device 100, and user information by using various sensors.

Here, the sensor included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and the like.

The output unit 150 may generate an output related to visual, audible, or tactile sense.

In this case, the output unit 150 may include a display unit for outputting visual information, a speaker for outputting audible information, a haptic module for outputting tactile information, and the like.

The memory 170 may store data supporting various functions of the AI device 100. For example, the memory 170 may store input data, learning data, a learning model, learning history, and the like obtained by the input unit 120.

The processor 180 may determine at least one executable operation of the AI device 100 on the basis of the information determined or generated by using a data analysis algorithm or a machine learning algorithm. Further, the processor 180 may control the components of the AI device 100 to perform the determined operation.

To this end, the processor 180 may request, search, receive, or utilize data of the learning processor 130 or the memory 170, and control the components of the AI device 100 to execute a predicted operation or an operation determined to be preferred among the at least one executable operation.

In this case, if an external device is required to be associated to perform the determined operation, the processor 180 may generate a control signal for controlling a corresponding external device and transmit the generated control signal to the external device.

The processor 180 may obtain intent information regarding a user input and determine a demand of the user on the basis of the obtained intent information.

In this case, the processor 180 may obtain intent information corresponding to the user input using at least one of a speech to text (STT) engine for converting a voice input into a character string or a natural language processing (NLP) engine for obtaining intent information of a natural language.

In this case, at least one or more of the STT engine and the NLP engine may be configured as an ANN of which at least a part is trained according to a machine learning algorithm. At least one of the STT engine or the NLP engine may be trained by the learning processor 130, may be trained by the learning processor 240 of the AI server 200, or may be trained by distributed processing thereof.

The processor 180 may collect history information including user's feedback about operation contents or the operation of the AI device 100 and stores the same in the memory 170 or the learning processor 130 or may transmit the same to an external device such as the AI server 200. The collected history information may be used to update the learning model.

The processor 180 may control at least some of the components of the AI device 100 to drive an application program stored in the memory 170. Further, the processor 180 may operate two or more of the components included in the AI device 100 in combination with each other to drive the application program.

Figure 2:
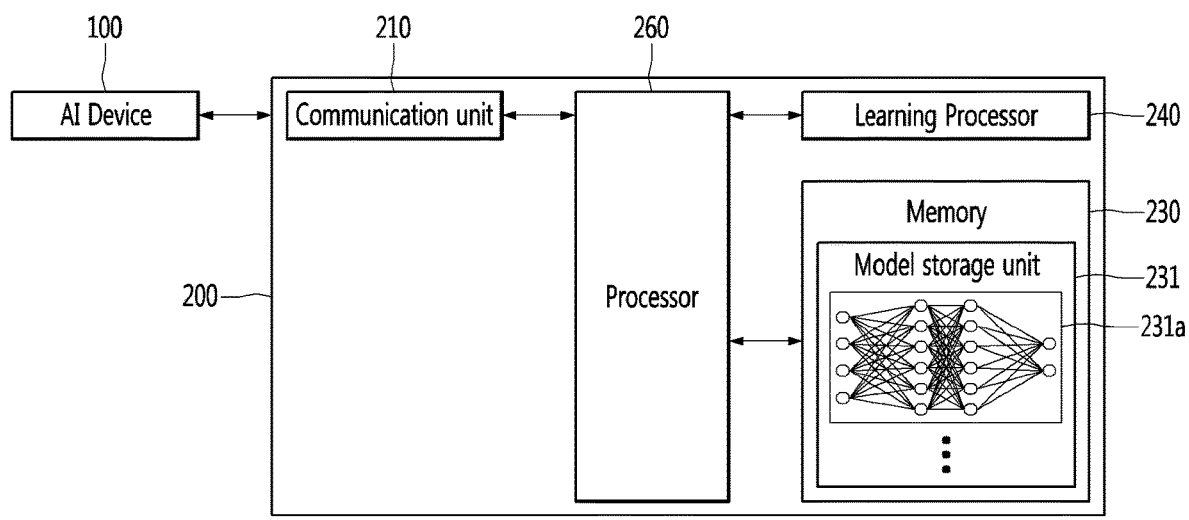
FIG. 2 illustrates an AI server connected to a robot according to an embodiment of the present invention.

FIG. 2 illustrates an AI server 200 according to an embodiment of the present invention.

Referring to FIG. 2, the AI server 200 may refer to an apparatus for training the ANN using a machine learning algorithm or a device using the trained ANN. Here, the AI server 200 may include a plurality of servers to perform distributed processing or may be defined as a 5G network. Here, the AI server 200 may be included as a portion of the AI device 100 to perform at least a portion of the AI processing together.

The AI server 200 may include a communication unit 210, a memory 230, a learning processor 240, a processor 260, and the like.

The communication unit 210 may transmit/receive data to/from an external device such as the AI device 100.

The memory 230 may include a model storage unit 231. The model storage unit 231 may store a model being trained or trained (or an ANN 231a) through the learning processor 240.

The learning processor 240 may train the ANN 231a using the learning data. The learning model may be mounted and used in the AI server 200 of the ANN or may be mounted and used in an external device such as the AI device 100.

The learning model may be implemented by hardware, software or a combination of hardware and software. If some or all of the learning model are implemented by software, one or more instructions configuring the learning model may be stored in the memory 230.

The processor 260 may infer a result value for new input data using the learning model and generate a response or control command on the basis of the inferred result value.

Figure 3:
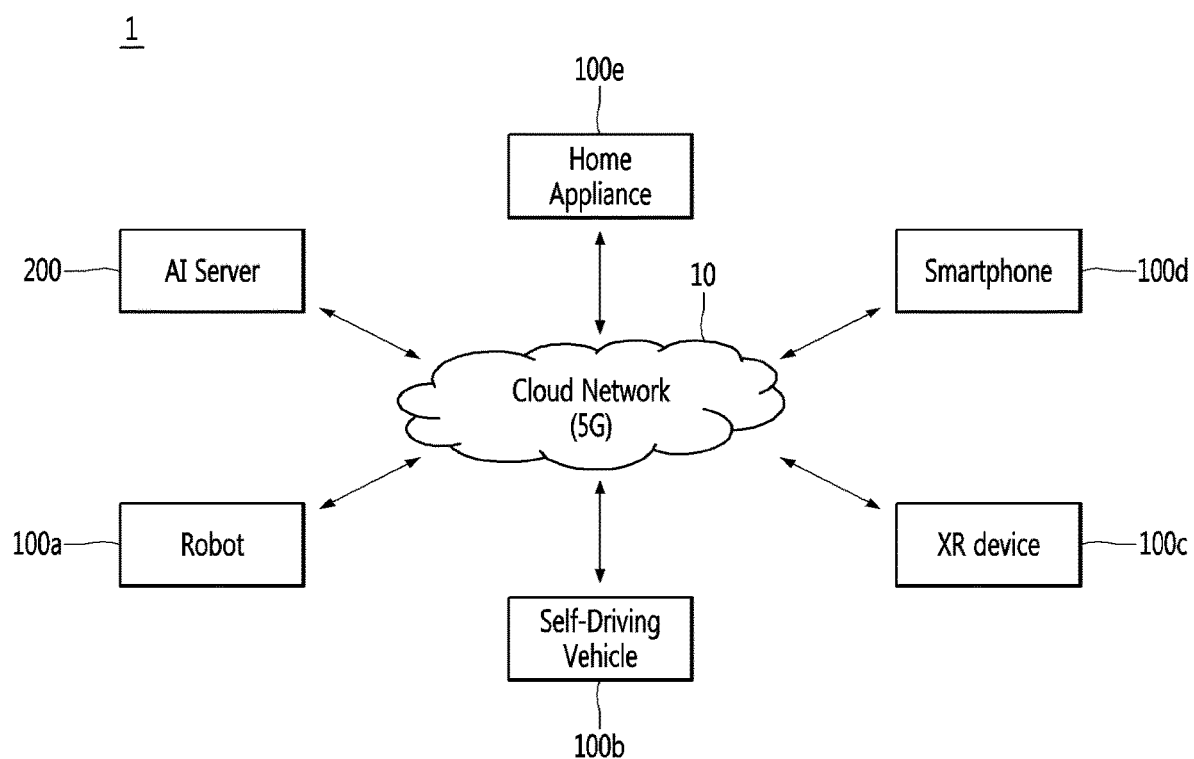
FIG. 3 illustrates an AI system including a robot according to an embodiment of the present invention.

FIG. 3 illustrates an AI system 1 according to an embodiment of the present invention.

Referring to FIG. 3, in the AI system 1, at least one of an AI server 200, a robot 100a, an autonomous vehicle 100b, an XR device 100c, a smartphone 100d, or a home appliance 100e is connected to a cloud server 10. Here, the robot 100a, the autonomous vehicle 100b, the XR device 100c, the smartphone 100d, or the home appliance 100e, to which the AI technology is applied, may be referred to as an AI device 100a to 100e.

The cloud network 10 may refer to a network that configures part of or existing within a cloud computing infrastructure. Here, the cloud network 10 may be configured using a 3G network, 4G or LTE network or a 5G network.

That is, each of the devices 100a to 100e and 200 configuring the AI system 1 may be connected to each other through the cloud network 10. In particular, the devices 100a to 100e and 200 may communicate with each other through a base station or may communicate with each other directly without passing through the base station.

The AI server 200 may include a server that performs AI processing and a server that performs calculation on big data.

The AI server 200 may be connected to at least one of the robot 100a, the autonomous vehicle 100b, the XR device 100c, the smartphone 100d, or the home appliance 100e configuring the AI system 1 via the cloud network 10 and help at least a portion of AI processing of the connected AI devices 100a to 100e.

In this case, the AI server 200 may train the ANN according to the machine learning algorithm on behalf of the AI devices 100a to 100e and directly store or transmit the learning model to the AI devices 100a to 100e.

Here, the AI server 200 may receive input data from the AI device 100a to 100e, infer a result value for the received input data using the learning model, generate a response or a control command based on the inferred result value, and transmit the response or the control command to the AI devices 100a to 100e.

Alternatively, the AI devices 100a to 100e may directly infer a result value for the input data using the learning model and generate a response or control command based on the inferred result value.

Hereinafter, various embodiments of the AI device 100a to 100e to which the technology described above is applied will be described. Here, the AI devices 100a to 100e illustrated in FIG. 3 may be considered as a specific embodiment of the AI device 100 illustrated in FIG. 1.

<AI+Robot>

The robot 100a, to which the AI technology is applied, may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implemented by hardware.

The robot 100a may obtain state information of the robot 100a detect (recognize) a surrounding environment and an object, generate map data, determine a movement path or a travel plan, determine a response to user interactions, or determine actions by using sensor information obtained from various kinds of sensors.

Here, the robot 100a may use sensor information obtained from at least one sensor among a lidar, a radar, and a camera to determine a movement route and a travel plan.

The robot 100a may perform the above operations by using a learning model configured as at least one ANN. For example, the robot 100a may recognize a surrounding environment and an object using the learning model and determine an operation using the recognized surrounding environment information or object information. Here, the learning model may be directly trained by the robot 100a or may be trained by an external device such as the AI server 200.

In this case, the robot 100a may directly perform an operation by generating a result using the learning model or transmit sensor information to an external device such as an AI server 200 and receive a result generated accordingly to perform an operation.

The robot 100a may determine the movement route and the travel plan by using at least one of the map data, the object information detected from sensor information, or the object information obtained from the external device, and travel according to the determined movement path and the travel plan by controlling the driving unit.

The map data may include object identification information for various objects arranged in a space in which the robot 100a moves. For example, the map data may include object identification information about fixed objects such as walls and doors and movable objects such as flower pots and desks. The object identification information may include a name, a kind, a distance, a position, and the like.

In addition, the robot 100a may control the driving unit on the basis of the control/interaction of the user, thereby performing an operation or driving. In this case, the robot 100a may obtain intent information of the interaction according to the user's motion or speech and determine a response on the basis of the obtained intent information to perform the operation.

The robot and the server of the present invention may correspond to the AI device and the AI server disclosed in FIGS. 1 and 2, respectively, and sub-components thereof may correspond to an example of the AI device 100 and the AI server 200 described above. That is, the components included in the AI device 100 of FIG. 1 and the components included in the AI server 200 of FIG. 2 may be included in the robot and the server of the present invention, respectively.

Figure 4:
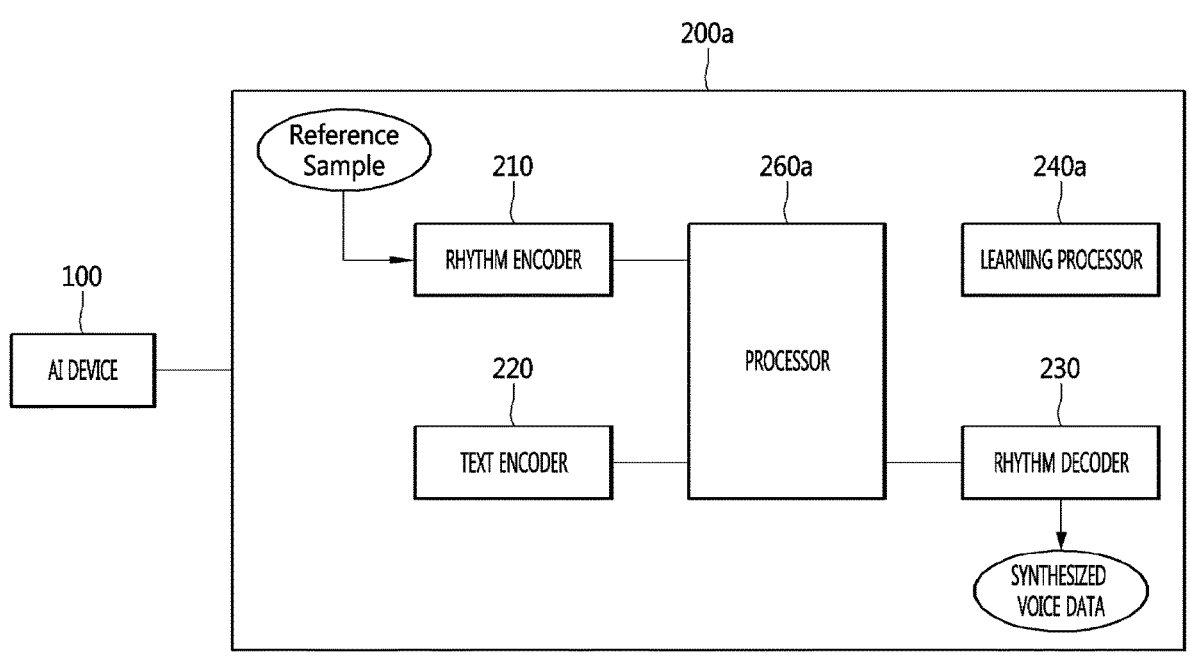
FIG. 4 illustrates a configuration of an AI-based voice sampling apparatus according to an embodiment of the present invention.

FIG. 4 illustrates a configuration of an AI-based voice sampling apparatus according to an embodiment of the present invention.

Referring to FIG. 4, the present invention may include a rhyme encoder 210, a text encoder 220, a processor 260a, a learning processor 240a, and a rhyme decoder 230.

The rhyme encoder 210 may receive a user's voice, extract a voice sample, and analyze a voice feature included in the voice sample. The rhyme encoder 210 may collect standard voice data and model a vocal tract that serves as a filter for representing a vocal cord and a sound source by the vocal cord as a phoneme and a tone.

The rhyme encoder 210 may extract a vocal cord feature parameter and a vocal tract feature model parameter on the basis of the modeling and may utilize a basic frequency extraction and a vocal tract cepstral coefficient extraction technology from a voice signal. Through this process, voice samples may be collected and the user's vocal features for the voice spoken may be analyzed.

The rhyme encoder 210 may divide the voice sample by a predetermined label and extract an embedding vector for the label. In the method of extracting a feature vector from the voice sample in the label, spectral information for each unit interval may be extracted or a sliding extraction value may be used. Alternatively, the feature vector may be extracted using a mean value.

In a spectral information-based acoustic feature information inference, a vocal feature including at least one of a user's speech rate, a pronunciation stress, a pause interval, a pitch, or an intonation may be extracted.

There may be reference samples having various characteristics in the same label, which are caused in the process of securing a voice sample corresponding to a specific label, and since all the voice samples present in each label do not exhibit the same degree of characteristics and may exhibit characteristics similar to a voice sample of another label in some cases.

The rhyme encoder 210 may extract the embedding vector through a vocal feature including at least one of a speech rate, pronunciation stress, pause interval, pitch, or intonation of the user included in the voice sample.

The embedding vector may be extracted through spectral information, sliding information, or a mean value.

According to an embodiment, the rhyme encoder 210 may include a separate embedding device. The embedding device extracts a speech style of the user. When a voice is input from the user or a separate device, the embedding device may convert the voice into a vector representation by an already learned neural network model. The embedding device may convert, for example, words in the voice into a vector value or feature vector embedded by the previously learned neural network model. In this case, the neural network model may be configured as, for example, a regression neural network (RNN).

The rhyme encoder 210 may include a speech style profile generating module, through which an input signal for a user speech received from the user is received and a user speech sentence according to the input signal for the transmitted user speech is identified to analyze the meaning of the identified user speech sentence and determine a user speech style according to the analyzed meaning of the user speech sentence.

A personal speech style profile based on the identified user speech style is generated, and to this end, a personal speech style profile generating module may include an analyzer for a morpheme, a tagger, an entity name and semantic feature recognizer, and a personal speech style profile generator.

The text encoder 220 may receive a text for reflecting the vocal feature. The text encoder 220 may also include another embedding device other than the embedding device of the rhyme encoder 210.

The embedding device of the text encoder 220 may embed an unlabeled word on the basis of labeled words included in the input sentence and at least one searched labeled word. By embedding the unlabeled word on the basis of the labeled words included in the input sentence and at least one searched labeled word, the embedding device may improve accuracy of embedding such that a feature vector corresponding to the unlabeled word has a more similar meaning in context.

The embedding device may embed the unlabeled word using at least one similar sentence. The embedding device may embed the unlabeled word, for example, by applying at least one similar sentence to a second model distinguished from the first model. In this case, the second model may include, for example, a neural network estimating the meaning of a word on the basis of at least one of a context of the input sentence and/or a relationship between words included in the input sentence.

The second model may be configured as, for example, a recurrent neural network (RNN), a convolutional neural network (CNN), a bidirectional RNN, and the like. The embedding device may embed the unlabeled word using at least some of words included in the at least one sentence.

The processor 260a may classify the vocal feature from the voice sample input to the rhyme encoder 210 according to a label, extract an embedding vector representing the vocal feature from the label, generate a speech style from the embedding vector, and apply the generated speech style to the text.

The processor 260a may analyze the text input to the text encoder 220 and embed and apply the speech style extracted by the rhyme encoder 210 described above. The processor 260a may detect the unlabeled word included in the input sentence and embed the unlabeled word on the basis of the labeled words included in the input sentence.

The processor 260a may search for at least one labeled word corresponding to the unlabeled word using at least one of web search or a pre-stored dictionary database. The processor 260a may embed the unlabeled word on the basis of the labeled words included in the input sentence and the at least one searched labeled word.

The processor 260a may obtain a predetermined type feature vector corresponding to the word for each of the plurality of words included in the input sentence. If the predetermined type feature vector corresponding to the word is not obtained, the processor 260a may detect the corresponding word as an unlabeled word.

The present invention may further include a memory. The memory may store the feature vector according to the embedding result from the processor 260a or store at least one labeled word corresponding to an unlabeled word searched using at least one of web search or pre-stored dictionary database. The memory may store various pieces of information generated during the processing by the processor 260a described above. Also, the memory may store information received through the transmission/reception interface 1010.

According to an embodiment of the present invention, the processor 260a may extract a representative voice sample from a voice sample input from the rhyme encoder 210.

Extracting of the voice sample will be described by Examples 1 to 3 together with FIGS. 6 and 7 of a method invention below.

The learning processor 240a may be connected to the processor 260a, play a role similar to that of the learning processor 240 of the AI server described above, and the learning processor 240a may train the ANN 231a using the learning data. The learning model may be mounted in the AI server of the ANN and used or may be mounted in an external device such as the AI device 100 and used.

The learning model may be implemented by hardware, software or a combination of hardware and software. When a portion or the entirety of the learning model is implemented by software, one or more instructions configuring the learning model may be stored in the memory 230.

The rhyme decoder 230 may output synthesized voice data to which the speech style is applied to the text by the processor 260a.

The rhyme decoder 230 serves as a terminal for synthesizing text and voice and outputting the same, and may be configured to output synthesized voice data for input text reflecting a vocal feature of a specified user.

According to an embodiment, in generating the synthesized voice data for the input text of "How are you", the vocal feature may be configured to be reflected in the synthesized voice data. Here, the vocal feature of a specific user may not only simulate voice of the user but also include at least one of various elements such as rhyme, emotion, tone, pitch, etc., which are styles that may configure vocalization.

Hereinafter, a sampling method for providing a speech style using the AI-based voice sampling apparatus described above will be described.

Figure 5:
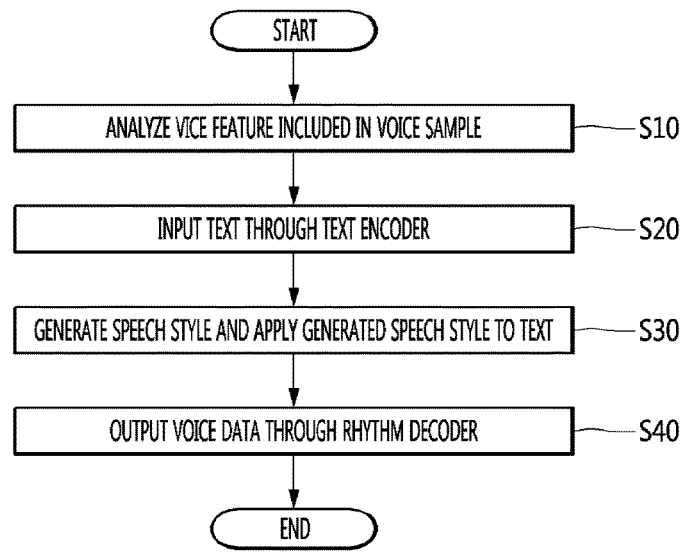
FIG. 5 illustrates a flowchart of an AI-based voice sampling method according to an embodiment of the present invention.

FIG. 5 is a flowchart illustrating an AI-based voice sampling method according to an embodiment of the present invention.

Referring to FIG. 5, the AI-based voice sampling method may include a first step S10 of analyzing a vocal feature, a second step S20 of receiving text through the text encoder 220, a third step of generating a speech style and applying the speech style to the text, and a fourth step S40 of outputting synthesized voice data through the rhyme decoder 230.

The first step S10 of analyzing the vocal feature is a process of receiving a voice sample of the user through the rhyme encoder 210 and analyzing the vocal feature included in a voice sample of the user. In the first step S10, the above-described rhyme encoder 210 may be used, and according to an embodiment, the rhyme encoder 210 may receive a voice sample of the user and extract a vocal feature of a speaker from the received voice signal.

Here, the received voice sample may include speech spectral data indicative of information related to the user's vocal feature. In extracting the user's vocal feature, any known suitable feature extracting method that may extract the vocal feature from the user's voice sample may be used.

According to an embodiment, the vocal feature may be extracted from the received voice sample using a voice processing method such as mel frequency cepstral (MFC). Alternatively, the vocal feature may be extracted by inputting the voice sample to the ANN of the learning processor 240a. Thereafter, the extracted user's vocal feature may be represented as an embedding vector.

According to an embodiment, the processor 260a may extract the extracted speaker's vocal feature from the learning processor 240a or store the same in the memory. Further, the processor 260a may store the vocal feature in the database or an external storage device.

The processor 260a may select or designate a vocal feature of at least one of a plurality of user's voice features previously stored in a storage medium when the voice is synthesized for the input text, and the selected or designated vocal feature of the user may be used for speech synthesis.

The second step of receiving text through the text encoder 220 is a process of extracting an embedding vector from the voice sample, generating a speech style by the processor 260a, and applying the generated speech style to the text.

According to an embodiment, the text encoder 220 may receive an input text and may be configured to convert the input text into character embedding to generate it. Such character embedding may be generated by inputting a single ANN text speech synthesis model, for example, pre-net, CBHG module, DNN, CNN+DNN, or the like.

The second step (S20) may include receiving a voice sample from the user; and dividing the voice sample into a preset label and extracting an embedding vector for the label.

The rhyme encoder 210 may divide the voice sample by a predetermined label and extract an embedding vector for the label. In the method of extracting the feature vector from the voice sample in the label, spectral information for each unit interval may be extracted or a sliding extraction value may be used. Alternatively, the feature vector may be extracted using a mean value.

In a spectral information-based acoustic feature information inference, a vocal feature including at least one of a user's speech rate, a pronunciation stress, a pause interval, a pitch, or an intonation may be extracted.

The rhyme encoder 210 may extract the embedding vector through a vocal feature including at least one of a speech rate, pronunciation stress, pause interval, pitch, or intonation of the user included in the voice sample.

The embedding vector may be extracted through spectral information, sliding information, or a mean value. The embedding vector may be extracted through a vocal feature including at least one of a speech rate, pronunciation stress, a pause interval, a pitch, and an intonation of the user included in the voice sample. In the receiving of the voice sample, the voice sample may be received in real time from the user within a predetermined time interval.

According to an embodiment, the rhyme encoder 210 may include a separate embedding device. The embedding device extracts a speech style of the user. When a voice is input from the user or a separate device, the embedding device may convert the voice into a vector representation by an already learned neural network model. The embedding device may convert, for example, words in the voice into a vector value or feature vector embedded by the previously learned neural network model. In this case, the neural network model may be configured as, for example, a regression neural network (RNN).

In the third step S30 of generating a speech style and applying the generated speech style to text, the processor 260a is involved, and the processor 260a classifies the vocal feature from voice sample input to the rhyme encoder 210 according to label, extracting an embedding vector representing the vocal feature from the label, generating a speech style from the embedding vector, and applying the generated speech style to the text.

The fourth step S40 of outputting synthesized voice data through the rhyme decoder 230 is a process of outputting synthesized voice data which is the text reflecting the style. That is, it is a process of reflecting the user's style received from the processor 260a on the text and outputting synthesized voice data through the rhyme decoder 230.

The rhyme decoder 230 may be configured to receive the vocal feature of the user. The rhyme decoder 230 may receive the user's voice feature from the processor 260a. According to an embodiment, the rhyme decoder 230 may include an attention module configured to determine from which part of the input text a voice is to be generated at a current time-step.

The rhyme decoder 230 may input the vocal feature and the input text of the user into a single ANN text speech synthesis model to generate and output synthesized voice data corresponding to the input text. The output synthesized voice data is synthesized voice data reflecting the user's vocal feature, and output voice data shown that a first speaker reads the input text may be generated on the basis of a preset vocal feature of the first speaker.

The present invention may further include generating an ANN text-speech synthesis model by performing machine learning on the basis of a plurality of pieces of learning text and voice data corresponding to the plurality of pieces of learning text.

The ANN text speech synthesis model may be trained using a large database existing as a pair of text and voice sample and is a single ANN that put text is input and learned through an algorithm and a desired voice is output when certain text is finally input.

Figure 6:
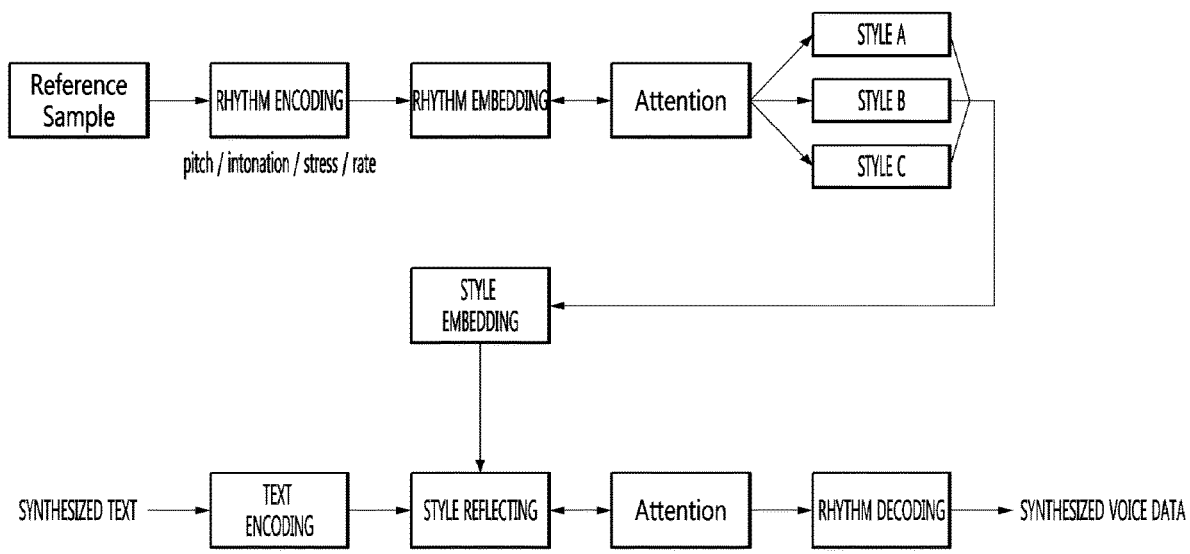
FIG. 6 illustrates a detailed flowchart of outputting synthesized voice data according to an embodiment of the present invention.

FIG. 6 is a detailed flowchart of outputting synthesized voice data according to an embodiment of the present invention and FIG. 7 is a view illustrating selecting a representative voice sample according to an embodiment of the present invention.

Referring to FIGS. 6 and 7, it may be seen how synthesized voice data is generated through the above-described series of processes, and in particular, a specific voice sampling method for extracting a user's speech style will be described.

Referring back to FIG. 7, a process of obtaining a representative voice sample may be known when multiple words are received from the user.

As in Case 1, when a voice sample located at the center of a corresponding label is referred to as a reference, a sample that meets the purpose of the corresponding label may be considered as a median value, and a sample deviating from the median value may be considered as an undesired voice sample.

As in Case 2, when a voice sample located at an extreme end portion of the label is referred to as a reference, it may be difficult to be considered as a sample that meets the purpose of the corresponding label and may be synthesized as an extreme voice in a desired style.

As in Case 3, when a sample located at a boundary with another label is referred to as a reference, it may be difficult to be considered as a sample that meets the purpose of the corresponding label and may be unintentionally synthesized with a voice corresponding to a style of another label.

Therefore, in order to derive a voice sample corresponding to the median value, each voice sample is represented as an embedding vector value as described above, and the most ideal voice sample may be extracted through a relationship between each voice sample and other voice samples.

Example 1

Based on Core

The processor 260a may select a voice sample that is closest to a mean value for each vector component of all voice samples in the label, from among the voice samples input from the user.

An average of all the vectors may be calculated and mean values of the vectors and the respective vectors may be compared. If a difference is large, it means that the vector significantly deviates from a median value, so a vector with the smallest difference may be regarded as a vector close to the mean value.

Example 2

Based on Density

The processor 260a may select a voice sample in which the sum of distances of the vector components to each voice sample among the plurality of voice samples input from the user is the smallest.

In the case of a representative voice sample, there is a high possibility that a vector value thereof may be in a space in which other vectors are concentrated, and if the vector value is in a space with low density, there is a high possibility that it may be an accidental, unintentional voice sample. In order to calculate a vector placed in the highest density, the density of the current vector may be calculated by calculating a spatial density with a neighboring vector with respect to each vector.

Thus, a distance to a surrounding vector is calculated, and when a vector with the smallest sum of the distances to each vector is found, the corresponding voice sample will be located at a position with a higher density than other voice samples.

Example 3

Based on Distance

The processor 260a may select a voice sample having the smallest sum of distances of the vector components with the voice samples in the label, from among the voice samples input from the user.

Distance-based is a concept similar to the density-based described above, and features that it is calculated in the label and the smallest total sum of the distance with all the voice samples in the label may be selected.

A representative voice sample may be extracted through <Embodiment 1> to <Embodiment 3> described above.

The present invention may further include a communication unit although not shown. The communication unit may be configured such that the AI-based voice sampling apparatus transmits and receives a signal or data to and from an external device.

According to an embodiment, the communication unit may be configured to receive text from an external device. Here, the text may include learning text to be used for learning a single ANN text-speech synthesis model. Alternatively, the text may include input text received from a user terminal. Such text may be provided to at least one of the text encoder 220 or the rhyme decoder 230.

According to an embodiment, the communication unit may receive a user's vocal feature from an external device. The communication unit may receive a voice sample of the user from the external device and transmit the received voice sample to the rhyme encoder 210.

In addition, the communication unit may transmit information related to the generated synthesized voice data, that is, synthesized voice data to an external device. In addition, the generated single ANN text speech synthesis model may be transmitted to another device through the communication unit.

The present invention has the effect that a more friendly and natural voice data may be provided to the user according to the user's speech style by selecting a representative voice sample from a user's voice sample.

Further, the present invention has the advantage that synthesis may be selected according to a user style in spite of the same type phrase or sentence in synthesizing by the voice sampling apparatus and method, whereby a synthesized voice having various types of rhythms may be generated.

It will be apparent to those skilled in the art that various modifications and variations may be made in the present invention without departing from the spirit or scope of the disclosures. Thus, it is intended that the present invention covers the modifications and variations of this disclosure provided they come within the scope of the appended claims and their equivalents.

What is claimed is:

1. An artificial intelligence (AI)-based voice sampling apparatus for providing a speech style, the apparatus comprising:
   a rhyme encoder configured to receive a user's voice to extract a voice sample, and analyze a vocal feature included in the voice sample;
   a text encoder configured to receive text for reflecting the vocal feature;
   a processor configured to classify the vocal feature of the voice sample input to the rhyme encoder according to a label, extract an embedding vector representing the vocal feature from the label, and generate a speech style from the embedding vector and apply the generated speech style to the text; and
   a rhyme decoder configured to output synthesized voice data in which the speech style is applied to the text by the processor,
   wherein the rhyme encoder divides the voice sample by a predetermined label and extracts the embedding vector for the label, and
   wherein the processor selects a voice sample closest to a mean value for each vector component of all voice samples in the label, from among a plurality of voice samples input from the user.

2. The apparatus of claim 1, wherein the rhyme encoder further extracts the embedding vector through a vocal feature including at least one of a speech rate, a pronunciation intonation, a pause interval, a pitch, or an intonation of the user included in the voice sample.

3. The apparatus of claim 1, wherein the rhyme encoder extracts the embedding vector through the vocal feature including at least one of a speech rate, a pronunciation intonation, a pause interval, a pitch, or an intonation of the user included in the voice sample.

4. The apparatus of claim 3, wherein the extracting of the embedding vector comprises extracting through spectral information, sliding information, or a mean value.

5. The apparatus of claim 1, wherein the processor further selects a voice sample having the smallest sum of the distances of the vector components to each of the voice samples in the label among the plurality of voice samples input from the user.

6. The apparatus of claim 1, wherein the processor further selects a voice sample having the smallest sum of distances of the vector components to the each of voice samples among the plurality of voice samples input from the user.

7. An artificial intelligence (AI)-based voice sampling method for providing a speech style, the method comprising:
   a first operation of receiving a voice sample of a user through a rhyme encoder to analyze a vocal feature included in the voice sample of the user;
   a second operation of receiving a text for reflecting the vocal feature through a text encoder;
   a third operation of extracting an embedding vector from the voice sample, generating a speech style by a processor, and applying the speech style to the text; and
   a fourth operation of outputting synthesized voice data to which the speech style is applied, through a rhyme decoder,
   wherein the processor selects a voice sample closest to a mean value for each vector component of all voice samples in the label, from among a plurality of voice samples input from the user.

8. The method of claim 7, wherein, in the extracting of the embedding vector from the voice sample, the embedding vector is extracted through a vocal feature including at least one of a speech rate, a pronunciation intonation, a pause interval, a pitch, or an intonation of the user included in the voice sample.

9. The method of claim 7, further comprising:
   generating an artificial neural network text-speech synthesis model by performing machine learning on the basis of a plurality of learning texts and voice data corresponding to the plurality of learning texts.

10. The method of claim 7, wherein the second operation comprises:
    receiving the voice sample from the user; and
    dividing the voice sample into a preset label to extract the embedding vector for the label.

11. The method of claim 10, wherein the embedding vector is extracted through the vocal feature including at least one of a speech rate, a pronunciation intonation, a pause interval, a pitch, or an intonation of the user included in the voice sample.

12. The method of claim 10, wherein the embedding vector is extracted through spectral information, sliding information, or a mean value.

13. The method of claim 7, wherein the receiving of the voice sample comprises receiving the voice sample from the user in real time from the user within a predetermined time interval.

14. The method of claim 7, wherein the processor further selects a voice sample having the smallest sum of distances of the vector components to the each of voice samples among the plurality of voice samples input from the user.

15. The method of claim 7, wherein the processor further selects a voice sample having the smallest sum of the distances of the vector components to each of the voice samples in the label among the plurality of voice samples input from the user.

* * * * *